United States Patent [19]
Sukhman et al.

[11] Patent Number: 5,867,517
[45] Date of Patent: Feb. 2, 1999

[54] INTEGRATED GAS LASER RF FEED AND FILL APPARATUS AND METHOD

[75] Inventors: Yefim P. Sukhman, Scottsdale; Christian Julian Risser, Phoenix, both of Ariz.

[73] Assignee: Universal Laser Systems, Inc., Scottsdale, Ariz.

[21] Appl. No.: 846,550

[22] Filed: Apr. 30, 1997

[51] Int. Cl.$^6$ .............................. H01S 3/22; H01S 3/223
[52] U.S. Cl. ................................................... 372/58
[58] Field of Search ................................................ 372/58

[56] References Cited

U.S. PATENT DOCUMENTS

| | | |
|---|---|---|
| 3,593,189 | 7/1971 | Buhrer . |
| 3,763,442 | 10/1973 | McMahan . |
| 4,169,251 | 9/1979 | Laakmann . |
| 4,342,113 | 7/1982 | Iwata . |
| 4,363,126 | 12/1982 | Chenausky . |
| 4,373,202 | 2/1983 | Laakmann . |
| 4,383,203 | 5/1983 | Stanley . |
| 4,429,398 | 1/1984 | Chenausky . |
| 4,443,877 | 4/1984 | Chenausky . |
| 4,451,766 | 5/1984 | Angle . |
| 4,455,658 | 6/1984 | Sutter . |
| 4,493,087 | 1/1985 | Laakmann . |
| 4,563,763 | 1/1986 | Kuhn . |
| 4,589,114 | 5/1986 | Sutter, Jr. . |
| 4,596,018 | 6/1986 | Gruber . |
| 4,612,648 | 9/1986 | Peterson et al. . |
| 4,613,972 | 9/1986 | Bettman . |
| 4,631,449 | 12/1986 | Peters . |
| 4,672,620 | 6/1987 | Slusher et al. . |
| 4,675,874 | 6/1987 | Pohler . |
| 4,679,202 | 7/1987 | Maloney . |
| 4,688,228 | 8/1987 | Newman . |

(List continued on next page.)

OTHER PUBLICATIONS

Team Company, Inc. *Cold Welding Information*. Pinch–Off Systems, Precision Tools for Cold Welding. Aug. 1993.

Laakmann, Peter, "The Market Continues to Grow for Sealed Carbon Dioxide Lasers". *Industrial Laser Review.* Oct., 1993. pp. 9–12.

Morley, R.J., "Mode and Frequency Control of Compact $CO_2$ Slab Lasers Through Intra–Cavity Coherent Imaging". *Applied Optics.* vol. 34, No. 3, Jan. 20, 1995. pp.

*Primary Examiner*—Rodney Bovernick
*Assistant Examiner*—Robert E. Wise
*Attorney, Agent, or Firm*—Donald J. Lisa

[57] ABSTRACT

A sealed gas laser tube (10) has a pair of electrically insulated electrodes (53, 54) supported in the tube (11) adapted to couple to an external RF supply (30). With respect to each electrode, an RF feed terminal (84) having an externally threaded stem (84a) supported in the tube cooperates, through a sealable common feed/fill port (43) in the housing (11), with a movable plunger (100) stem (102) having an internally threaded central recess (105) supported (90) by the electrode such that when the terminal and plunger are in first positions spaced apart from each other, the plunger stem is withdrawn from the feed/fill port which is open wider than in the prior art enabling faster evacuation and refilling, and, when the terminal and plunger are in second positions drawn together, the plunger stem is pulled into the feed/fill port sealingly contacting an inner portion (82a) of an o-ring (82), the outer portion (82c) of which is simultaneously compressed (83) by the RF feed terminal to sealingly contact a feed/fill port wall, thereby re-sealing the tube and enabling normal laser operations with the RF feeds supplying the RF excitation. An opening (93) in the electrode support through which the plunger is drawn is wide enough that the plunger is self centering due to the action of the o-ring (82) as it is drawn tight by the RF feed terminal to close the port whereby bending forces are eliminated from the electrodes.

26 Claims, 7 Drawing Sheets

U.S. PATENT DOCUMENTS

| | | |
|---|---|---|
| 4,703,491 | 10/1987 | Lim . |
| 4,719,639 | 1/1988 | Tulip . |
| 4,748,634 | 5/1988 | Hesterman . |
| 4,779,284 | 10/1988 | Nissen . |
| 4,787,090 | 11/1988 | Newman . |
| 4,805,182 | 2/1989 | Laakmann . |
| 4,809,284 | 2/1989 | Chanausky . |
| 4,833,681 | 5/1989 | Akiyama . |
| 4,837,772 | 6/1989 | Laakmann . |
| 4,847,852 | 7/1989 | Yatsiv . |
| 4,852,109 | 7/1989 | Kuchar . |
| 4,856,010 | 8/1989 | Wissman . |
| 4,875,218 | 10/1989 | Hongo . |
| 4,891,819 | 1/1990 | Sutter, Jr. . |
| 4,893,353 | 1/1990 | Iwaoka . |
| 4,908,585 | 3/1990 | Chenausky . |
| 4,912,526 | 3/1990 | Iwaoka . |
| 4,928,756 | 5/1990 | Shull . |
| 4,930,136 | 5/1990 | Chaffee . |
| 4,953,172 | 8/1990 | Gurski . |
| 4,953,176 | 8/1990 | Ekstrand . |
| 4,969,153 | 11/1990 | Leyshon . |
| 5,008,894 | 4/1991 | Laakmann . |
| 5,048,032 | 9/1991 | Ekstrand . |
| 5,050,184 | 9/1991 | Nelson . |
| 5,065,405 | 11/1991 | Laakmann . |
| 5,113,407 | 5/1992 | Kobayashi . |
| 5,123,028 | 6/1992 | Hobart . |
| 5,131,003 | 7/1992 | Mefferd . |
| 5,135,604 | 8/1992 | Kumar . |
| 5,150,372 | 9/1992 | Nourrcier . |
| 5,151,916 | 9/1992 | Iehisa et al. . |
| 5,172,388 | 12/1992 | Long . |
| 5,216,689 | 6/1993 | Gardner . |
| 5,224,117 | 6/1993 | Kruger . |
| 5,251,223 | 10/1993 | Hiroshima . |
| 5,253,261 | 10/1993 | Chaffee . |
| 5,260,964 | 11/1993 | Morin . |
| 5,311,529 | 5/1994 | Hug . |
| 5,315,605 | 5/1994 | Nakazawa . |
| 5,335,242 | 8/1994 | Hobart . |
| 5,353,293 | 10/1994 | Shull . |
| 5,353,297 | 10/1994 | Koop . |
| 5,394,427 | 2/1995 | McMinn . |
| 5,412,681 | 5/1995 | Eisel . |
| 5,475,702 | 12/1995 | August . |
| 5,475,703 | 12/1995 | Scalise . |
| 5,479,428 | 12/1995 | Kuzumoto . |
| 5,549,795 | 8/1996 | Gregoire . |
| 5,586,134 | 12/1996 | Das . |
| 5,592,504 | 1/1997 | Cameron . |

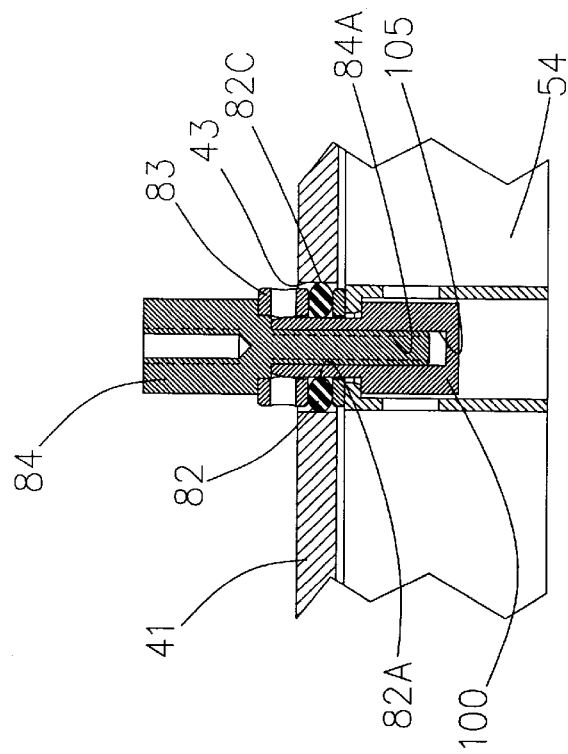
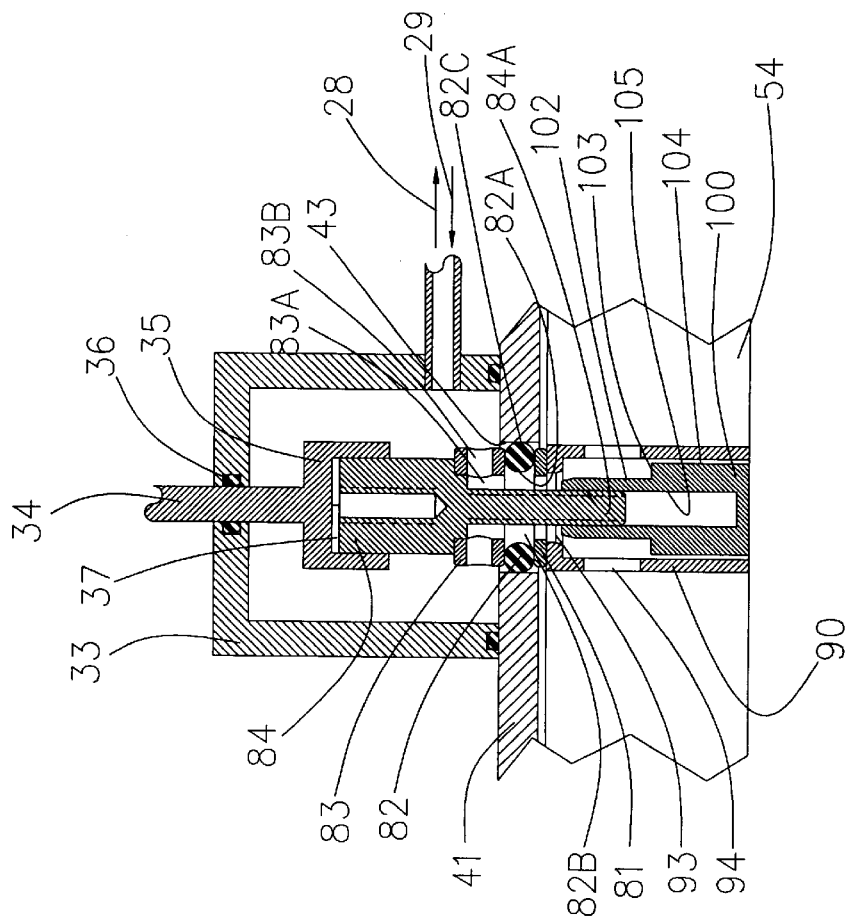
FIG 8
FIG 7

INTEGRATED GAS LASER RF FEED AND FILL APPARATUS AND METHOD

BACKGROUND OF THE INVENTION

1. Fields of the Invention

The present invention relates generally to an apparatus and method of providing radio frequency feed to a gas laser tube and to evacuating and filling a laser tube with a laser gas, and, more particularly, to an apparatus and method in which a gas inlet port in a common feed-fill structure is selectively opened by moving apart RF feed and internal members of the tube to permit rapid evacuation and filling through the port around the moveable components, and, then, is selectively closed by moving together the RF feed and internal components in the tube to re-seal the port.

2. Discussion of Background and Prior Art a. Pinch-Off Tubes

The final preparation of a laser tube includes a final bake-out, accepted as a standard procedure, and a final fill of the tube with a laser mixture. Final bake-out includes evacuation of the residual gases contained in the tube after initial processing of the tube and achieving high vacuum at an elevated temperature. The final bake-out can take as much as several hours. To minimize production time the cross section of the orifice through which vacuum pumping is accomplished must be maximized. A persistent problem with gas lasers during operation is the loss or degradation of laser gas over a period of time and degradation of the optics forming the laser resonator. In order to restore tubes to operational condition, the laser gas mixture and/or optical elements forming the laser resonator have to be replaced. Replacement of the above mentioned elements could be accomplished by operating the tube and subsequent reprocessing, including final bake-out and final laser fill. The reprocessing is as time consuming as the final stage of a new tube preparation. In the past when these critical parts break or are defective, it is also frequently required to throw away the entire expensive laser tube. An attempt to solve this problem is shown in FIG. 1 in which a laser tube assembly 10 includes a laser tube 11 and a copper pinch-off tube 12 through which a vacuum 13 is applied to evacuate the tube followed by a laser gas filling operation 14 through fill line 12. When the laser gas filling operation is completed, the copper line 12 is pinched-off 15 to seal line 12 to complete the vacuum envelope of the laser and enable the desired laser gas pressure to be maintained. Pinch-off is accomplished with a precision pinch-off tool which produces a permanent leak-proof type seal in the copper fill port tubing 12 by symmetrically collapsing and cold welding and severing the tubulation at cut-off area 16 in a single, simple operation with no loss of vacuum or laser gas mixture pressure. The pinched-off portion of the tube must then be cut-off in order to perform a refill.

In an improvement to Peterson in U.S. Pat. No. 4,612,648 the pinched-off copper tube is connected to the laser tube via a removable fitting thereby allowing the gas fill tube 12 to be easily replaced so that the laser tube could be easily reprocessed by evacuation and refilling and then reused. However, in such a mechanism the RF feed terminals are separate and spaced from the gas fill tube making the technique cumbersome and inefficient.

Accordingly, it is an object of the present invention to provide an integrated RF feed and gas fill structure which uses common elements to enable more efficient evacuation and filling operations while maintaining high quality RF feed functions during normal laser operations through the common structure.

b. Integrated RF Feed/Fill Structure

It is also generally known to perform the RF feed and filling functions of a gas laser using elements common to both functions. For example, in a system to Slusher in U.S. Pat. No. 4,672,620 for a fast axial flow carbon dioxide laser a cathode electrode is mounted in a gas inlet port in a wall of a discharge tube and is cooled by the gas on its way into the tube. The problem with this arrangement, however, is that the system does not accommodate sealed laser tubes which have the laser gas wholly contained therein.

Accordingly, it is an object of the present invention to provide an integrated RF feed and gas fill structure for sealed gas laser tubes which totally contain the laser gas therein.

In a more important variety of this type of prior art which uses common RF feed and fill elements is a well known device 20 shown in FIGS. 3,4 in which the gas laser tube or housing 21 has a recessed opening or fill port 22 in which is positioned an RF feed terminal 23 mounted through an o-ring 25 and threaded into insulated 26 electrode 24. In this device 20 a removable vacuum bell 27 is placed sealingly around the RF feed terminal 23 which is unscrewed outwardly from electrode 24 unporting recessed opening 22 for performing the evacuating 28 and then laser gas filling 29 steps. Upon completion of the laser gas filling step 29, as seen in FIG. 4, the RF feed terminal 23 is screwed inwardly into tight engagement with the electrode 24 thereby compressing o-ring 25 to re-seal recessed opening 22. To resume normal laser operations, an external RF supply 30 can then be coupled to the RF feed terminal 23, the return connection being made through the grounded housing 31. One problem with this device, however, is that the small clearance between the threaded stem portion of RF feed terminal 23 and the inner surfaces of O-ring 25 and the recessed opening or fill port 22 does not permit rapid evacuation or filling operations. The end result is a low level of efficiency of operation. Additionally, a bending force 32 is applied to the electrode 24 when the RF feed terminal 23 is screwed in thereby deforming at least one of the electrodes. Accordingly, it is an object of the present invention to provide an integrated RF feed-fill structure which enables fast evacuating and filling operations and totally eliminates all bending forces applied to electrodes.

Further objects and advantages will be apparent from the summary and detailed description of the present invention which follows.

SUMMARY OF THE INVENTION

Set forth below is a brief summary of the invention in order to achieve the forgoing and other benefits and advantages in accordance with the purposes of the present invention as embodied and broadly described herein.

One aspect of the invention is in an integrated RF feed and gas fill structure of a gas laser having a sealed housing forming an enclosure for a laser gas, a pair of electrodes supported in the housing and forming a discharge area and at least one of the electrodes being electrically insulated, at least one of the electrodes being coupled to an RF feed terminal supported in the housing and constructed and configured for coupling to an external RF supply for RF exciting the laser gas, an optical resonator aligned with the discharge area for producing directional optical energy, and the integrated RF feed and gas fill structure supported in the housing including an opening in the housing, an RF feed terminal extending into the opening with sufficient clearance for permitting evacuating the housing and filling the housing with the gas through the opening, a sealing element in the opening between the RF feed and the housing, and the RF feed terminal being movable between a first position in which the opening is unsealed and a second position in which the opening is sealed, wherein the improvement includes a plunger supported by an electrode, engageable with the movable RF feed terminal, and movable between a first position removed from the opening, when the RF feed terminal is in the first position, and a second position in the opening and contacting the sealing element to re-seal the housing, when the RF feed terminal is in the second position, whereby a wider clearance is provided when the RF feed terminal and the plunger are in the first position for evacuating the housing and fast filling the housing with the gas.

A further feature of this aspect of the invention is wherein the sealing element is a compressible o-ring which is uncompressed when the RF feed terminal and plunger are in the first position and is compressed when the RF feed terminal and plunger are in the second position.

A further feature of this aspect of the invention includes the plunger having a first portion of reduced diameter adjacent the RF feed terminal forming a shoulder with a second portion of the plunger of larger diameter, the first portion being positioned out of the opening when the plunger is in the first position and in the opening with the shoulder electrically coupling to the electrode when the plunger is in the second position.

A still further feature of this aspect of the invention includes a bushing supported between the RF feed terminal and the sealing element having a central bore communicating with the opening and a body portion having at least one lateral opening therethrough communicating with the central bore, and forming an evacuation and fill passage for the gas when the RF feed terminal and plunger are in the first position and compressing the sealing element to seal the opening in the housing when the RF feed terminal and plunger are in the second position.

A still further feature of this aspect of the invention includes the RF feed terminal having a reduced diameter stem portion cooperating with a reduced diameter portion of the plunger, the reduced diameter portions of the RF feed terminal and of the plunger further cooperating with the central bore of the bushing and with the o-ring such that a substantial clearance is provided between the outside diameter of the RF feed terminal stem and the inside diameter of the bushing central bore to allow for evacuating the housing and fast filling the housing with the gas when the RF feed terminal and plunger are in the first position and for receiving the reduced diameter portion of the plunger in the central bore when the RF feed terminal and the plunger are in the second position.

A further feature of this aspect of the invention is wherein the cooperation between the reduced diameter portion of the RF feed terminal and the reduced diameter portion of the plunger further includes the terminal portion being rotatable from outside of the housing and being threaded into the plunger portion which is held non-rotatable by an electrode support.

A further feature of this aspect of the invention is wherein the further cooperation between the reduced diameter portions of the RF feed terminal and of the plunger with the central bore of the bushing and with the o-ring further includes the RF feed terminal being rotated which causes the reduced diameter portion of the RF feed terminal to be drawn into the reduced diameter portion of the plunger the outside diameter of which is drawn into a close fit in the central bore of the bushing and into sealing contact with an inner circumference of the o-ring which is compressed by the bushing as the RF feed terminal and plunger are being brought together causing the outer circumference of the O-ring to sealingly contact a wall portion of the opening in the housing to re-seal the housing.

A further feature of this aspect of the invention is wherein there is an opening, a movable RF feed terminal, a bushing, a sealing element, and a movable plunger associated with each electrode.

A further feature of this aspect of the invention includes an electrode support having an opening through which the plunger is drawn by the RF feed terminal with sufficient clearance therearound that a self-centering action of the sealing element in the housing opening allows the plunger to adjust its position in the electrode support opening without binding, whereby bending forces are eliminated from being applied to the electrodes.

Another aspect of the present invention is in a process of RF feeding and gas filling a gas laser through a common feed-fill structure which includes the steps of providing a sealed housing forming an enclosure for a laser gas, supporting a pair of electrodes in the housing for forming a discharge area and at least one of the electrodes being electrically insulated, supporting at least one RF feed terminal in the housing constructed and configured for coupling to an external RF supply for exciting the laser gas, coupling at least one of the electrodes to the at least one RF feed terminal, aligning an optical resonator with the discharge area for producing directional optical energy, and supporting the integrated RF feed and gas fill structure in the housing including the steps of providing an opening in the housing, extending an RF feed terminal into the opening with sufficient clearance for permitting evacuating the housing and gas filling the housing with the gas through the opening, supporting a sealing element in the opening between the RF feed terminal and the housing, and moving the RF feed terminal between a first position in which the opening is unsealed and a second position in which the opening is sealed, wherein the improvement includes the steps of supporting a plunger by an electrode, engageable with the movable RF feed terminal, and moving the plunger between a first position removed from the opening, when the RF feed terminal is in the first position, and a second position in the opening and contacting the sealing element to re-seal the housing, when the RF feed terminal is in the second position, whereby a wider clearance is provided when the RF feed terminal and the plunger are in the first position for evacuating the housing and filling the housing with the gas.

Further features of this aspect of the invention include the process steps carried out by the apparatuses described above and are made clear in the description of the drawings and the detailed description of the preferred embodiment which follows.

The advantages of the present invention are:
  1. Pumping of the gas into and out of the tube goes faster with a wider opening in the fill port.
  2. Bending forces which might stress the tube or deform the electrodes are eliminated thereby stabilizing the plasma and eliminating potential optical resonator misalignment.
  3. The need to cut off, unscrew or discard filling tubes is eliminated.

4. Components common to the RF feed and gas fill functions are used for both operations further reducing costs and increasing efficiency.

5. A better vacuum may be produced in the gas laser tube prior to filling further increasing the efficiency and life of the gas laser tube.

BRIEF DESCRIPTION OF THE DRAWINGS

FIG. 7 is a front elevation view in section of the integrated RF feed/fill structure of the present invention showing the RF feed/fill port in the open position.

FIG. 8 is a front elevation view in section of the integrated RF feed/fill structure of the present invention showing the RF feed/fill port in the closed position.

DETAILED DESCRIPTION OF THE PREFERRED EMBODIMENT a. Tube Assembly

Figure 1:
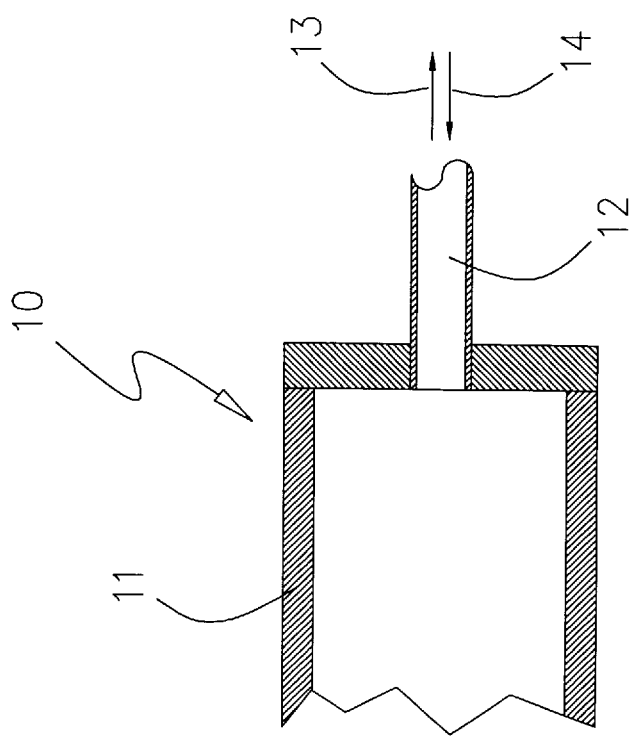
FIG. 1 is a schematic view of a prior art gas laser with the fill port in the open position.
Figure 2:
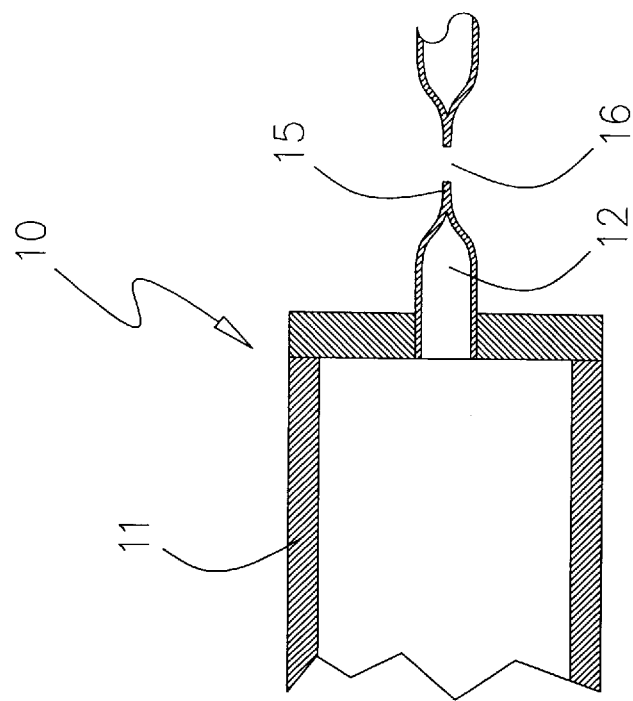
FIG. 2 is a schematic view of the prior art gas laser of FIG. 1 with the fill port in the closed position after pinch-off and cut off at a cold welded area.
Figure 3:
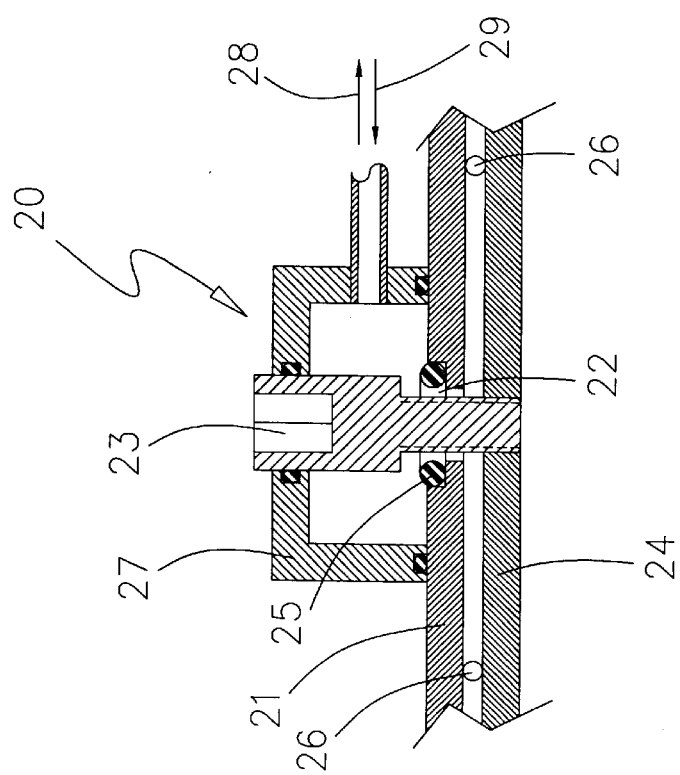
FIG. 3 is a schematic view of a prior art gas laser with an integrated RF feed/fill port in the open position.
Figure 4:
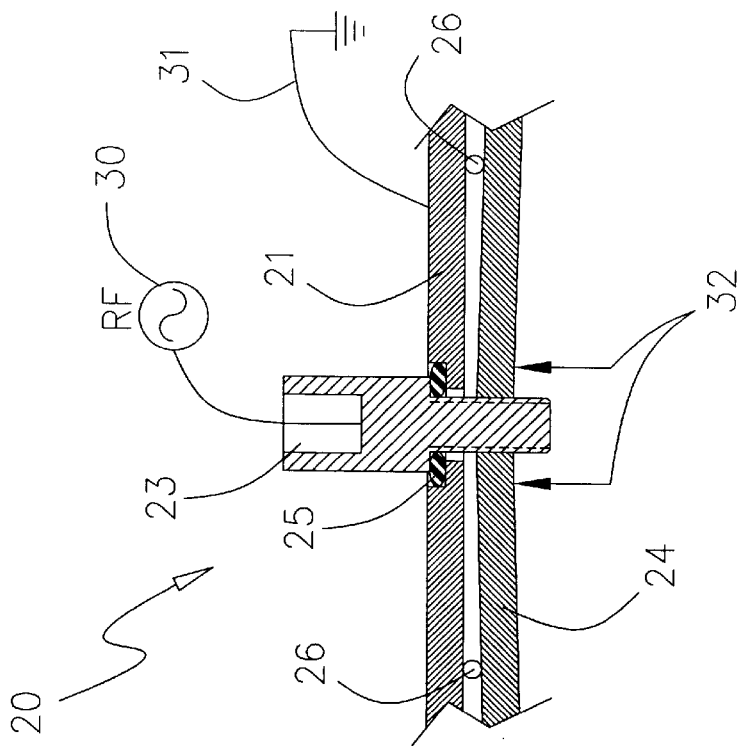
FIG. 4 s a schematic view of the prior art gas laser of FIG. 3 with the RF feed/fill port in the closed position and bending forces applied to the electrode.
Figure 5:
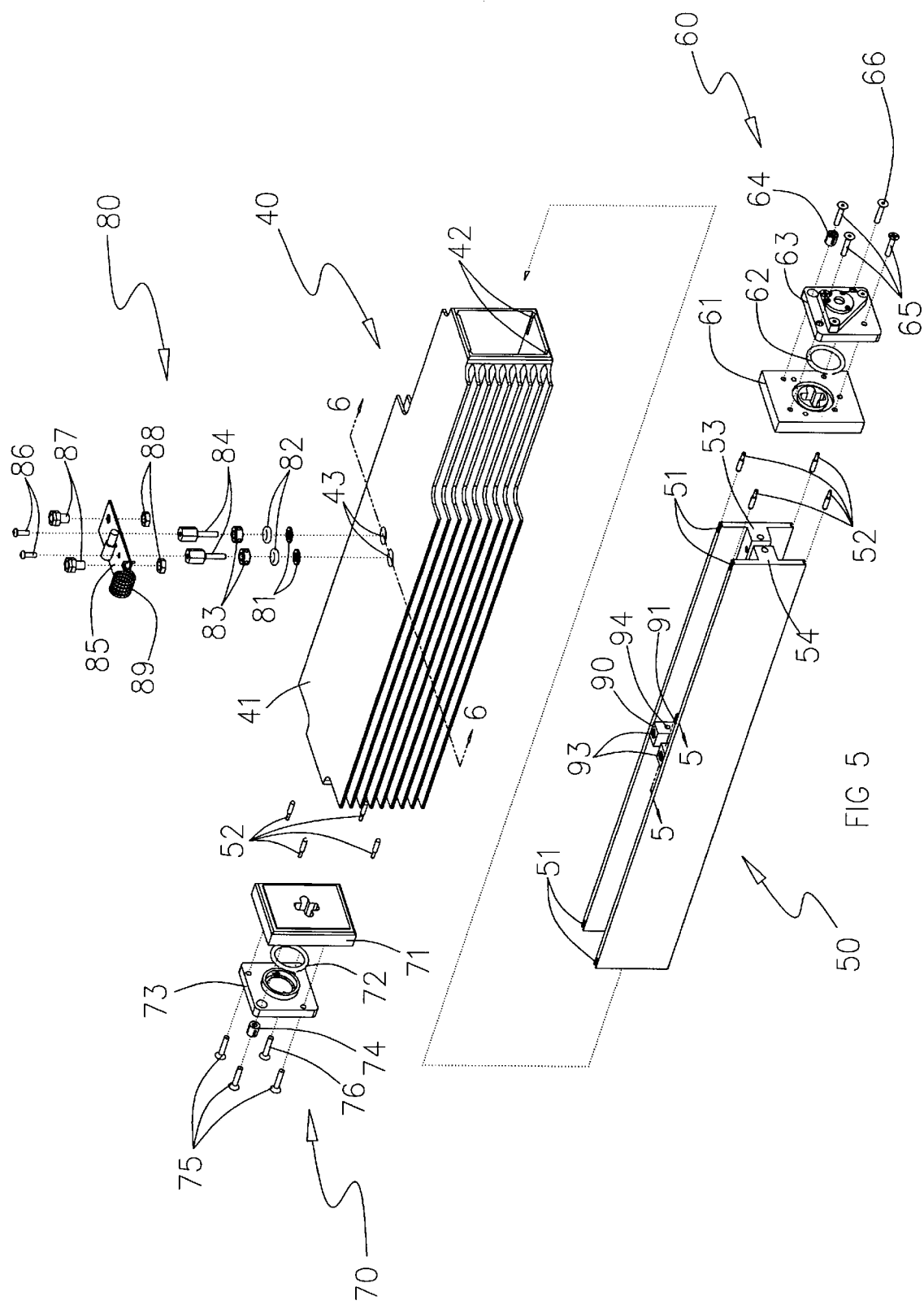
FIG. 5 an exploded perspective view of a gas laser tube assembly including the electrode assembly, the front and rear mirror/end cap assemblies, and the integrated feed/fill assembly of the present invention.

As best seen in FIG. 5 the tube assembly 40, which includes electrode assembly 50, front mirror/end cap assembly 60, rear mirror/end cap assembly 70, and integrated feed/fill assembly 80 of the present invention, are shown in an exploded perspective. Tube assembly 40 includes tube 41 which is an extruded, profiled, and finned aluminum structure completely sealed except for the end openings and the feed/fill ports 43 which are also sealed as described in greater detail below. Machined or extruded in each end of tube 41 are four longitudinal grooves or recesses 42, one at each corner to cooperate with matching longitudinal grooves or recesses 51 machined or extruded in the outer ends of each of the electrodes. Insulated pins 52 are received in recesses 42, 51 when the electrode assembly 50 is mounted inside tube assembly 40 and accommodate unconstrained longitudinal expansion of the electrode assembly 50 without distortion due to differential heating of the tube and electrode assembly 50 during normal laser operations.

b. Electrode Assembly

Figure 6:
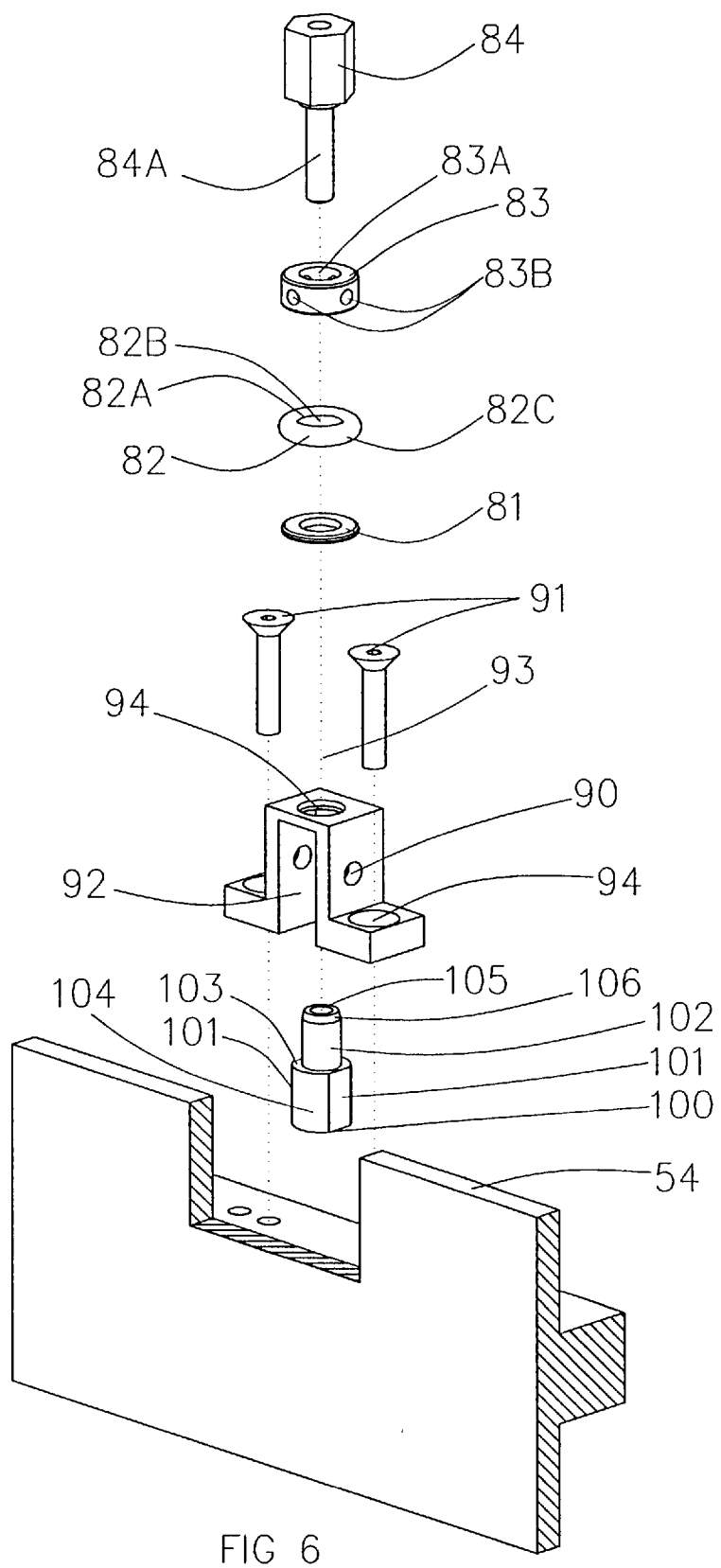
FIG. 6 is an exploded perspective view of the left electrode subassembly showing the integrated RF feed terminal engageable with the moveable plunger supported by the electrode.

As seen in FIGS. 5, 6, electrode assembly 50 includes right electrode 53 and left electrode 54 together with a plunger housing 90 mounted by screws 91 to each electrode and having a slot 92, a top fill gas opening 93 of extra large dimension for self adjustment of the plunger within opening 93 without binding as a result of the O-ring 82 self-centering itself within housing port 43 during assembly, as described in greater detail below, and a pair of side gas fill openings 94. Slidably mounted within slot 92 for up and down movement is plunger 100 having flatted sides 101 which ride in and are guided by slot 92 and prevent rotation of the plunger 100 in the slot 92. Plunger 100 has a stem portion of reduced diameter 102 extending upwardly from a larger diameter portion 104 forming a shoulder 103 therebetween. The end of stem 102 is tapered 106 to fit into the center bore 82*b* of O-ring 82 without damaging the O-ring as more fully described below. Stem 102 of plunger 100 has a threaded central recess 105 to cooperate with the threaded stem 84*a* of RF feed terminal 84, as more fully described below.

c. Integrated Feed/Fill Assembly

The next step in assembling tube assembly 40 is to insert electrode assembly 50 into laser tube 41 and align top gas fill openings 93 of plunger housings 90 with the feed/fill ports 43. Next, RF feed terminals 84 are inserted through bushings 83, O-rings 82, and spacer washers 81 and then threaded 84*a* into the threaded central recesses 105 of plungers 100. RF feed board assembly 85 is then mounted to RF feed terminals 84 by screws 86 and is made ready for coupling to an external power supply by screwing RF Bannana terminal (female) plugs 87 into hex nuts 88. Notice that one RF terminal 84 couples to its respective RF Bannana terminal plug 87 through coil 89.

Bushings 83 have central bores 83*a* through which are disposed the threaded reduced diameter stems 84*a* of RF feed terminals 84. Bushings 83 further include lateral openings 83*b* communicating with central bores 83*a* and openings 43 of tube 41 which in turn communicate with top gas fill openings 93 of plunger housings 90 and side gas fill openings 94 of plunger housings 90 to form a pair of continuous evacuation and gas fill passageways when RF feed terminals 84 and plungers 100 are in their first opened positions. Those passageways are sealed by O-rings 82 when RF feed terminals 84 and plungers 100 are in their second positions drawn together by screwing RF feed terminal stems 84*a* into plunger threaded recesses 105 drawing the two components together with tapered tip 106 of plunger stem 102 entering central bore 82*b* of O-ring 82 and being self-centered therein adjusting plunger stem 102 within gas fill opening 93 due to the extra large clearance therebetween. O-rings 82 are simultaneously compressed by bushing 83.

d. Front Mirror/End Cap Assembly

As viewed in FIG. 5, the front mirror/end cap assembly 60 is first sub-assembled before it is sealingly attached to close the front of tube 41. The sealing attachment of front mirror/end cap assembly 60 to the front end of the tube 41 (and also the sealing attachment of rear mirror/end cap assembly 70 to the rear end of tube 41) is preferably done by welding. However, it may also be accomplished by use of epoxy compound or an O-ring compressed by a screwed mounting.

As best seen in FIGS. 5, front mirror/end cap assembly 60 includes front end plate 61 having an O-ring recess adapted to receive front mirror assembly O-ring 62 therein and having a beam aperture therein corresponding substantially to the gap between electrodes 53 and 54.

Front mirror assembly 63 is secured to tube front end plate 61 via screws 65 inserted through corresponding mounting holes in front mirror assembly 63. Screws 65 are screwed into threaded holes in front end plate 61 pressing against o-ring 62 and forming a gas tight seal therebetween. Triangulated mirror adjustments are made via adjusting screws on front mirror assembly 63 and screw 66, and once the front mirror assembly is adjusted, it is locked in place with mirror lock 64 by one of the screws 65 in a procedure which is well known to those of ordinary skill in the art.

e. Rear Mirror/End Cap Assembly

Rear mirror/end cap assembly 70, as best seen in FIG. 5, includes a tube rear end plate 71 which sealingly closes the rear end of tube 41 and has a central aperture conforming generally to the gap between electrodes 53 and 54. Rear mirror assembly 73 is mounted to tube rear end plate 71 compressing O-ring 72 to form a gas tight seal therebetween. Rear mirror assembly 73 is secured to rear end plate 71 via rear mirror screws 75 inserted through mounting holes in rear mirror assembly 73 and secured in threaded rear mirror mounting screw holes in rear end plate 71. The same triangulated mirror adjustment mechanism is operable with respect to rear mirror assembly 73 via adjustment screw 76 as was effective for the two mirrors in the front mirror assembly 60.

Together the front and rear mirror/end cap assemblies 60, 70 form an optical resonator aligned with the discharge area for producing directional optical energy in and emanating from the discharge area.

f. Integrated RF Feed/Fill Cooperative Action

The cooperative action of the components of the integrated RF feed/fill structure of the present invention are best seen in FIGS. 7 and 8. Plunger 100 is moveable between a first position, as seen in FIG. 7, in which reduced stem portion 102 is removed from the central bore 82b of O-ring 82 and central bore 83a of bushing 83, when RF feed terminal 84 is in its first position unscrewed from within threaded central recess 105 of plunger 100, and a second position, as seen in FIG. 8, with the tapered tip 106 of stem 102 smoothly and self-centeringly moved upwardly into the central bore 82b of O-ring 82 and the central bore 83a of bushing 83 thereby sealingly contacting and compressing O-ring 82 to re-seal the housing, when RF feed terminal 84 is in the second position with stem 84a screwed into plunger threaded central recess 105 causing bushing 83 to compress O-ring 82 to re-seal the housing. The seal includes the inner circumference 82a of O-ring 82 bearing against the outside diameter of stem 102 of plunger 100 and also outer circumference 82c of O-ring 82 bearing against a vertical wall of feed/fill opening 43 of tube 41.

One advantage of this aspect of the construction is that the size of the top gas fill opening 93 is made large such that there is substantial clearance with the outside diameter of the stem 102 of the plunger. When RF feed terminal 84a is rotated and draws the plunger 100 upwardly, stem 102 has plenty of room to laterally self-adjust itself as it enters opening 93 and as its tapered tip 106 enters central bore 82b of O-ring 82 thereby eliminating any torsional stress or load on the electrode. Thus, no bending forces are applied to the electrodes 53, 54.

It is readily apparent that the structure of the present invention allows for a much wider clearance to be provided than was available in the prior art when the RF feed terminal 84 and plunger 100 are in their first positions enabling rapid evacuation of the housing and fast filling the housing with the laser gas.

Conversely, when the RF feed terminal 84 and plunger 100 are in the second position, the outside diameter of stem portion 102 of plunger 100 forms a close fit in the central bore 83a of the bushing as well as providing a sealing contact with the inner circumference 82a of the O-ring 82. Additionally, when plunger 100 is in its second (upper) position, electrical coupling is completed between RF feed 84 and electrode 54 when shoulder 103 of plunger 100 contacts and is held firmly against plunger housing 90 which is secured in direct contact with electrode 54 by screws 91 as seen in FIG. 8.

This cooperative action permits efficient evacuation and filling when the fittings are open and effective sealing and RF coupling when the fittings are in the closed position.

Figure 9:
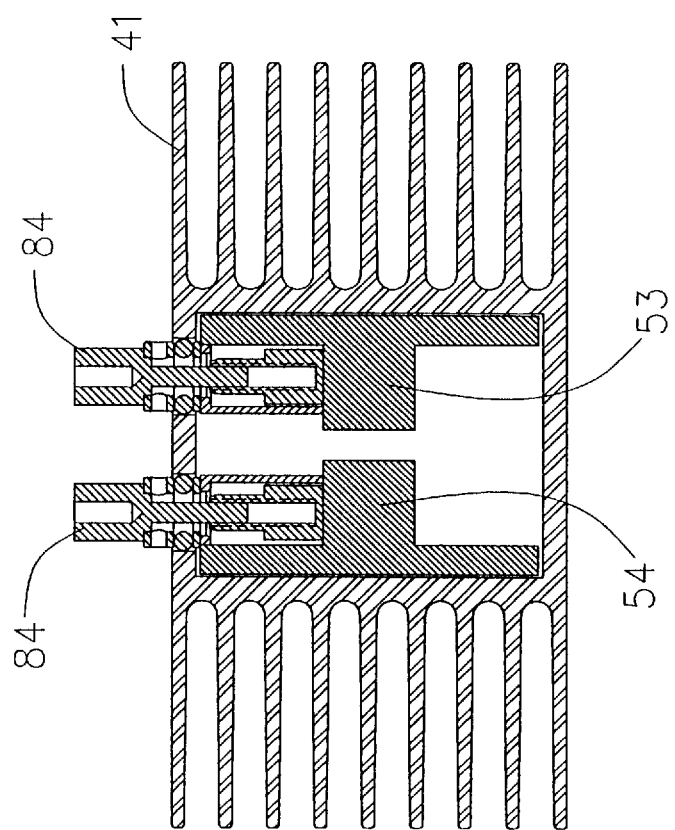
FIG. 9 is a front sectional elevation view of the integrated RF feed/fill structure of the present invention assembled in a feed/fill port associated with each electrode and the fill ports in the open position with the RF feeds threaded out from within the plungers supported by the electrodes.
Figure 10:
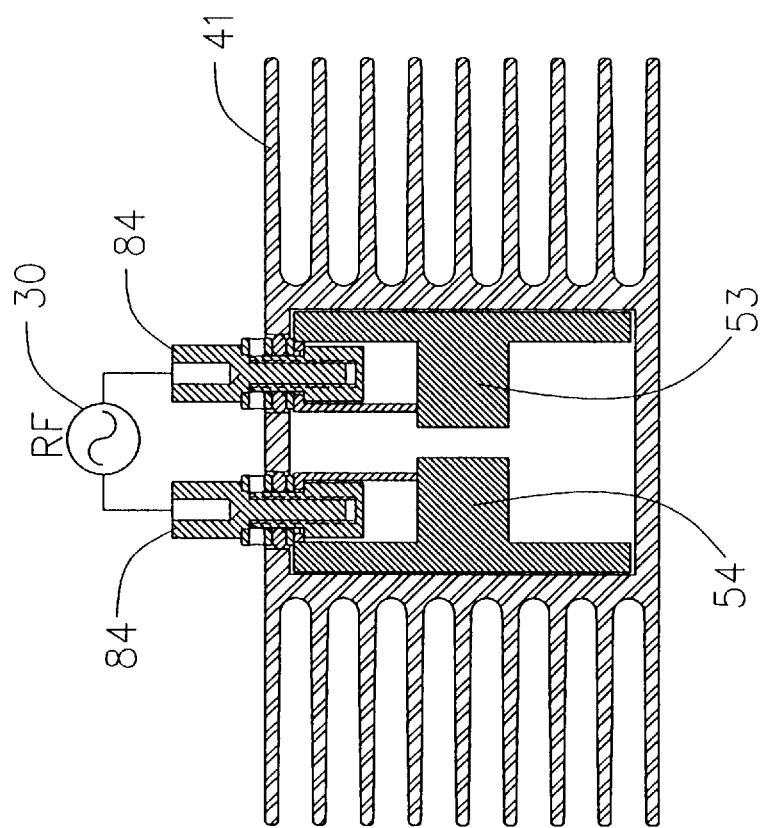
FIG. 10 is a front sectional elevation view of the integrated RF feed/fill structure of the present invention assembled in a feed/fill port associated with each electrode and the fill ports in the closed position with the RF feeds threaded into the plungers supported by the electrodes.

While the integrated RF feed/fill structure of the present invention may be used with respect to a single electrode, the preferred form of the invention is practiced by embodying the integrated RF feed/fill structure with respect to both electrodes as shown in FIG. 9, where the fill openings are open by RF feed terminals 84 being threaded out of plungers 100, and in FIG. 10, where the fill openings are closed by RF feed terminals being threaded into plungers 100.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. In an integrated RF feed and gas fill structure of a gas laser having a sealed housing forming an enclosure for a laser gas, a pair of electrodes supported in the housing and forming a discharge area and at least one of the electrodes being electrically insulated, at least one of the electrodes being coupled to at least one RF feed terminal supported in the housing and constructed and configured for coupling to an external RF supply for RF exciting the laser gas, an optical resonator aligned with the discharge area for producing directional optical energy, and the integrated RF feed and gas fill structure supported in the housing including an opening in the housing, an RF feed terminal extending into the opening with sufficient clearance for permitting evacuating the housing and filling the housing with the gas through the opening, a sealing element in the opening between the RF feed and the housing, and the RF feed terminal being movable between a first position in which the opening is unsealed and a second position in which the opening is sealed, wherein the improvement comprises:

a plunger supported by an electrode, engageable with the movable RF feed terminal, and movable between a first position removed from the opening, when the RF feed terminal is in the first position, and a second position in the opening and contacting the sealing element to re-seal the housing, when the RF feed terminal is in the second position whereby a wider clearance is provided when the RF feed terminal and the plunger are in the first position for evacuating the housing and fast filling the housing with the gas.

2. The gas laser of claim 1 wherein the sealing element is a compressible O-ring which is uncompressed when the RF feed terminal and plunger are in the first position and is compressed when the RF feed terminal and plunger are in the second position.

3. The gas laser of claim 1 wherein there is an opening, a movable RF feed terminal, a sealing element, and a movable plunger associated with each electrode.

4. The gas laser of claim 1 further comprising:
the plunger having a first portion of reduced diameter adjacent the RF feed terminal forming a shoulder with a second portion of the plunger of larger diameter, the first portion being positioned out of the opening when the plunger is in the first position and in the opening with the shoulder electrically coupling to the electrode when the plunger is in the second position.

5. The gas laser of claim 1 further comprising:
a bushing
supported between the RF feed terminal and the sealing element
having
a central bore communicating with the opening and
a body portion having at least one lateral opening therethrough communicating with the central bore, and
forming an evacuation and fill passage for the gas when the RF feed terminal and plunger are in the first position and
compressing the sealing element to seal the opening in the housing when the RF feed terminal and plunger are in the second position.

6. The gas laser of claim 5 further comprising:
the RF feed terminal having a reduced diameter stem portion cooperating with a reduced diameter portion of the plunger and the central bore of the bushing such that a substantial clearance is provided between the outside diameter of the RF feed terminal stem and the inside diameter of the bushing central bore to allow for evacuating the housing and fast filling the housing with the gas when the RF feed terminal and plunger are in the first position and for receiving the reduced diameter portion of the plunger in the central bore when the RF feed terminal and the plunger are in the second position.

7. The gas laser of claim 5 further comprising:
the RF feed terminal having a reduced diameter stem portion cooperating with a reduced diameter portion of the plunger, the reduced diameter portions of the RF feed terminal and of the plunger further cooperating with the central bore of the bushing and with the O-ring such that a substantial clearance is provided between the outside diameter of the RF feed terminal stem and the inside diameter of the bushing central bore to allow for evacuating the housing and fast filling the housing with the gas when the RF feed terminal and plunger are in the first position and for receiving the reduced diameter portion of the plunger in the central bore when the RF feed terminal and the plunger are in the second position.

8. The gas laser of claim 7 wherein the cooperation between the reduced diameter portion of the RF feed terminal and the reduced diameter portion of the plunger further comprises:
the terminal portion being rotatable from outside of the housing and being threaded into the plunger portion which is held non-rotatable by an electrode support.

9. The gas laser of claim 7 wherein the further cooperation between the reduced diameter portions of the RF feed terminal and of the plunger with the central bore of the bushing and with the O-ring further comprises:
the RF feed terminal being rotated which causes the reduced diameter portion of the RF feed terminal to be drawn into the reduced diameter portion of the plunger the outside diameter of which is drawn into a close fit in the central bore of the bushing and into sealing contact with an inner circumference of the O-ring which is compressed by the bushing as the RF feed terminal and plunger are being brought together causing the outer circumference of the O-ring to sealingly contact a wall portion of the opening in the housing.

10. The gas laser of claim 5 wherein there is an opening, a movable RF feed terminal, a bushing, a sealing element, and a movable plunger associated with each electrode.

11. The gas laser of claim 1 further comprising:
the RF feed terminal having a reduced diameter stem portion cooperating with a reduced diameter stem portion of the plunger.

12. The gas laser of claim 11 wherein the cooperation between the reduced diameter stem portion of the RF feed terminal and the reduced diameter stem portion of the plunger further comprises:
the terminal portion being rotatable from outside of the housing and being threaded into the plunger portion which is held non-rotatable in the electrode.

13. The gas laser of claim 1 further comprising:
the electrode having a support having an opening through which the plunger is drawn by the RF feed terminal with sufficient clearance therearound such that a self-centering action of the sealing element in the housing opening allows the plunger to adjust its position in the electrode support opening without binding whereby bending forces are eliminated from being applied to the electrodes.

14. In a process of RF feeding and gas filling a gas laser through a common feed-fill structure which includes the steps of
providing a sealed housing forming an enclosure for a laser gas,
supporting a pair of electrodes in the housing for forming a discharge area and at least one of the electrodes being electrically insulated,
supporting at least one RF feed terminal in the housing constructed and configured for coupling to an external RF supply for exciting the laser gas,
coupling at least one of the electrodes to the at least one RF feed terminal,
aligning an optical resonator with the discharge area for producing directional optical energy, and
supporting the integrated RF feed and gas fill structure in the housing including the steps of
providing an opening in the housing,
extending an RF feed terminal into the opening with sufficient clearance for permitting evacuating the housing and gas filling the housing with the gas through the opening,
supporting a sealing element in the opening between the RF feed terminal and the housing, and moving the RF feed terminal between a first position in which the opening is unsealed and a second position in which the opening is sealed, wherein the improvement comprises the steps of:

supporting a plunger by an electrode, engageable with the movable RF feed terminal, and moving the plunger between a first position removed from the opening, when the RF feed terminal is in the first position, and a second position in the opening and contacting the sealing element to re-seal the housing, when the RF feed terminal is in the second position, whereby a wider clearance is provided when the RF feed terminal and the plunger are in the first position for evacuating the housing and fast filling the housing with the gas.

15. The process of claim 14 wherein the step of moving the RF feed terminal and the plunger to the first position further comprises the step of de-compressing the O-ring and wherein the step of moving the RF feed terminal and plunger to the second position to re-seal the housing further comprises the step of compressing the o-ring.

16. The process of claim 14 wherein the steps of providing an opening, extending an RF feed terminal into the opening, supporting a sealing element, moving the RF feed terminal, and supporting and moving the plunger are performed with respect to each of the two electrodes.

17. The process of claim 14 further comprising the steps of:

forming a shoulder on the plunger between a first portion of reduced diameter adjacent the RF feed terminal and a second portion of larger diameter, and positioning the first portion out of the opening when the plunger is in the first position and in the opening with the shoulder electrically coupling to the electrode when the plunger is in the second position.

18. The process of claim 14 further comprising the steps of:

supporting a bushing between the RF feed terminal and the sealing element having
a central bore and
a body portion having at least one lateral opening therethrough, communicating the bushing lateral opening and central bore with the housing opening to form an evacuation and gas fill passage for the gas when the RF feed terminal and plunger are in the first position, and compressing the sealing element to seal the opening in the housing when the RF feed terminal and plunger are in the second position.

19. The process of claim 18 further comprising the steps of:

cooperating a reduced diameter stem portion of the RF feed terminal with a reduced diameter portion of the plunger and the central bore of the bushing including
providing a substantial clearance between the outside diameter of the RF feed terminal stem and the inside diameter of the bushing central bore to allow for evacuating the housing and fast filling the housing with the gas therethrough when the RF feed terminal and plunger are in the first position, and
receiving the reduced diameter portion of the plunger in the central bore when the RF feed terminal and the plunger are in the second position.

20. The gas laser of claim 18 further comprising:

cooperating a reduced diameter stem portion of the RF feed terminal with a reduced diameter portion of the plunger,
further cooperating the reduced diameter portions of the RF feed terminal and of the plunger with the central bore of the bushing and with the O-ring including the steps of
providing a substantial clearance between the outside diameter of the RF feed terminal stem and the inside diameter of the bushing central bore to allow for evacuating the housing and fast filling the housing with the gas therethrough when the RF feed terminal and plunger are in the first position, and
receiving the reduced diameter portion of the plunger in the central bore when the RF feed terminal and the plunger are in the second position.

21. The gas laser of claim 20 wherein the step of cooperating between the reduced diameter portion of the RF feed terminal and the reduced diameter portion of the plunger further comprises the step of:

rotating the terminal reduced diameter portion from outside of the housing to thread the terminal reduced diameter portion into the plunger reduced diameter portion which is held non-rotatable by an electrode support.

22. The process of claim 20 wherein the step of further cooperating between the reduced diameter portions of the RF feed terminal and of the plunger with the central bore of the bushing and with the O-ring further comprises the steps of:

rotating the RF feed terminal causing the reduced diameter portion of the RF feed terminal to move into the reduced diameter portion of the plunger the outside diameter of which is being drawn into a close fit in the central bore of the bushing and into sealing contact with an inner circumference of the O-ring which is being compressed by the bushing as the RF feed terminal and plunger are being brought together causing the outer circumference of the o-ring to sealingly contact a wall portion of the opening in the housing.

23. The process of claim 18 wherein the steps of providing an opening, extending an RF feed terminal into the opening, supporting a bushing, communicating the bushing, supporting a sealing element, moving the RF feed terminal, and supporting and moving the plunger are performed with respect to each of the two electrodes.

24. The process of claim 14 further comprising the step of:

cooperating a reduced diameter stem portion of the RF feed terminal with a reduced diameter portion of the plunger.

25. The gas laser of claim 24 wherein the step of cooperating between the reduced diameter stem portion of the RF feed terminal and the reduced diameter stem portion of the plunger further comprises the step of:

rotating the terminal reduced diameter portion from outside of the housing to thread the terminal reduced diameter portion into the plunger reduced diameter portion which is held non-rotatable by an electrode support.

26. The process of claim 14 further comprising the step of:

drawing the plunger through an opening in an electrode support with the RF feed terminal with sufficient clearance therearound that the plunger adjusts its position within the electrode support opening due to a self-centering action of the sealing element in the housing opening thereby eliminating any bending forces from being applied to the electrodes.

* * * * *

UNITED STATES PATENT AND TRADEMARK OFFICE
CERTIFICATE OF CORRECTION

PATENT NO. : 5,867,517

DATED : February 2, 1999

INVENTOR(S) : Yefim P. Sukhman, et al.

It is certified that error appears in the above-identified patent and that said Letters Patent is hereby corrected as shown below:

Column 5, line 29, delete "front" and insert --side--.

Column 5, line 29, after "section" insert --taken along the line 5-5 of FIG. 5--.

Column 5, line 32, delete "front" and insert --side--.

Column 5, line 32, after "section" insert --taken along the line 5-5 of FIG. 5--.

Column 5, line 35, after "view" insert --taken along the line 6-6 of FIG. 5--.

UNITED STATES PATENT AND TRADEMARK OFFICE
CERTIFICATE OF CORRECTION

PATENT NO. : 5,867,517
DATED : February 2, 1999
INVENTOR(S) : Yefim P. Sukhman, et al.

It is certified that error appears in the above-identified patent and that said Letters Patent is hereby corrected as shown below:

Column 5, line 40, after "view" insert --taken along the line 6-6 of FIG. 5--.

Signed and Sealed this

Thirteenth Day of April, 1999

*Attest:*

Q. TODD DICKINSON

*Attesting Officer*  *Acting Commissioner of Patents and Trademarks*